Dec. 20, 1966           H. JAWORSKI           3,292,818

MATERIAL FEEDING SYSTEM

Filed Oct. 18, 1965

INVENTOR

HENRY JAWORSKI

BY *Cullen, Sloman & Cantor*

ATTORNEYS

United States Patent Office 3,292,818
Patented Dec. 20, 1966

3,292,818
MATERIAL FEEDING SYSTEM
Henry Jaworski, 8650 Mount Elliott,
Detroit, Mich. 48211
Filed Oct. 18, 1965, Ser. No. 497,194
4 Claims. (Cl. 221—201)

This invention relates generally to a material feeding system, and more particularly to a system which provides a slow dribble feed of small discrete elements.

Bolts, nuts and other similar fastening devices are generally packaged in containers on a pound or weight basis. Thus, such items are generally poured or flowed into a shipping container positioned upon a weighing scale for determining the required weight. Since such items tend to tangle and flow in bunches, it is difficult to accurately teminate the flow when the desired weight has been reached.

Accordingly, it is an object of this invention to provide a feed system which separates tangled groups of elements and causes them to flow slowly and individually at spaced intervals, and which is particularly useful in pouring or flowing the last few parts into a container which has already been almost completely filled with the required number or weight of parts.

Other objects and advantages of this invention will become apparent from the following specification when considered in conjunction with the accompanying drawings.

Figure 1:
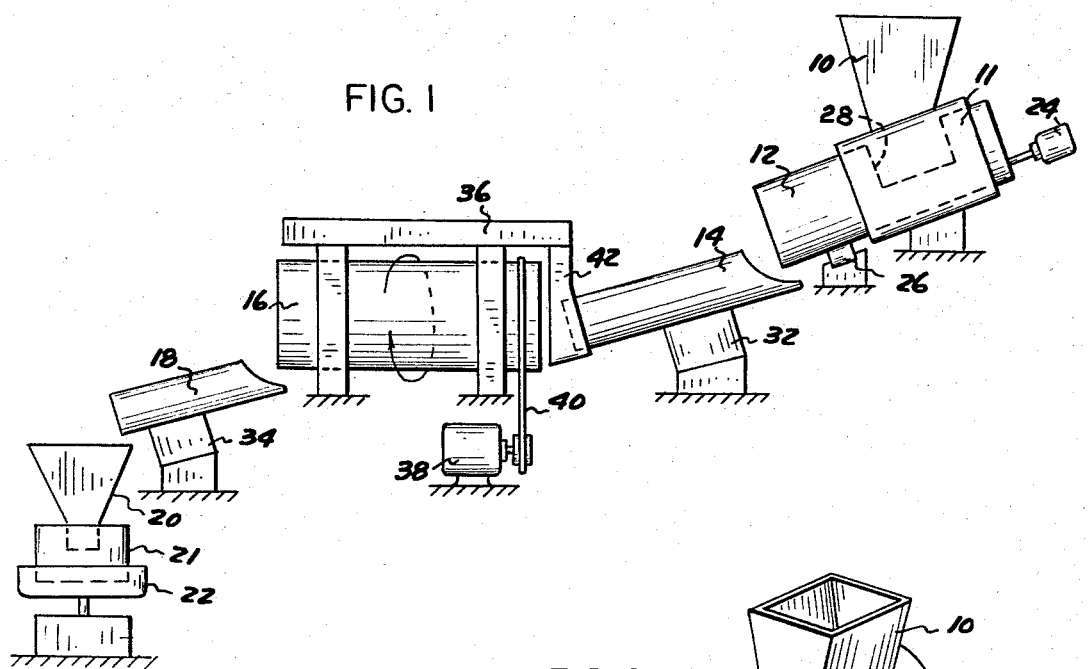
FIG. 1 is a schematic view of the entire dribble feed system of this invention.

Referring now to FIG. 1, the dribble feed system of this invention generally comprises a feed hopper 10, an oscillating tube 12, a first vibrating chute 14, a rotating tube 16 and a second vibrating chute 18. Bolts or the like parts are fed into the system from the feed hopper 10 and traverse the system until they are finally dumped from the second vibrating chute 18 through a funnel 20 into a container 21 positioned upon a conventional scale weighing pan 22.

The inclined oscillating tube 12 is rotatably supported within a lower cylindrical portion 11 of the feed hopper 10 and is caused to oscillate about its axis by a drive motor 24, which may be connected to the tube 12 by means of a pinion and ring gear (not illustrated) or the like. The lower left hand portion of oscillating tube 12 is supported on a pair of adjacent rollers 26 (only one of which appears in FIG. 1).

Figure 2:
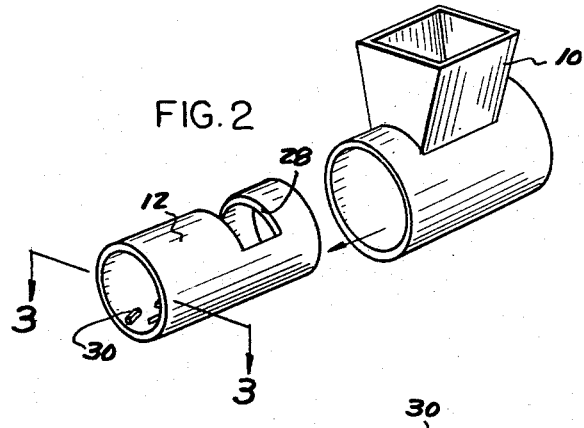
FIG. 2 is a partially exploded view of a portion of the system of FIG. 1.

Referring now to FIG. 2 in particular, oscillating tube 12 is illustrated as withdrawn from feed hopper 10. In this position a port 28 comprising a cut-out portion of the tube is visible. Port 28 in the assembled condition, as shown in FIG. 1, lies directly beneath the outlet of feed hopper 10.

Figure 3:
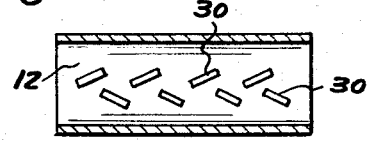
FIG. 3 is a plan view section taken along line 3—3 of FIG. 2.

Referring now to both FIGS. 2 and 3, it will be seen that a plurality of angled ridges 30 are spaced along the length of the inner portion of oscillating tube 12 opposite port 28. The purpose of these ridges or bumps will be described hereinafter.

A first vibrating chute 14 is aligned with and positioned slightly below the lower end of oscillating tube 12. Vibration or agitation of chute 14 is induced by means of a conventional mechanical vibrator indicated generally at 32. A similar vibrator 34 vibrates or agitates the second vibrating chute 18 which is aligned with and positioned slightly below the left (or outlet) end of rotating tube 16.

Rotating tube 16 is rotatably supported within a framework 36, and is driven by a motor 38 which may be drive connected to tube 16 by a chain or belt 40.

A stationary collar 42 is supported on frame 36 and serves to bridge the gap between the left (or outlet) end of vibrating chute 14 and the right (or inlet) end of rotating tube 16.

Figure 4:
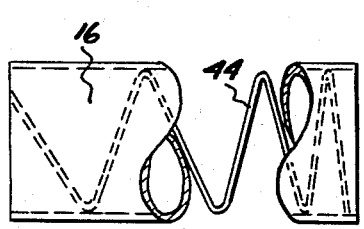
FIG. 4 is a partially fragmented elevation of the rotating tube.

Referring now to FIG. 4, an inwardly projecting helix 44 is wrapped around the inner wall of rotating tube 16. Helix 44 may be in the form of a spring welded to the inner wall of the tube. It will be noted that the pitch, or space between adjacent coils or ridges, of the helix increases from the right (or inlet) end of the tube to the left (or outlet) end of the tube. The purpose of this feature will be described hereinafter.

OPERATION

A quantity of bolts, for example, enter the system by gravity feed from feed hopper 10 to oscillating tube 12. Tube 12 oscillates rather slowly from one to 10 seconds per oscillation. The exact frequency of oscillation would depend upon the type and size of product being fed through the dribble system. The amplitude of oscillation is sufficient to carry port 28 past the lower opening of hopper 10, so that the uncut-out portion of tube 12 serves as a valve to close off the flow of bolts from the hopper. The periodic opening and closing of the flow from the hopper serves to reduce the quantity of bolts flowing through the system. As tube 12 oscillates slowly, some of the bolts tend to be caught on ridges 30, and initial separation results. The combination of the oscillating motion and the ridges tends to distribute and separate any clumps of bolts which may exist at this point in the system.

The bolts flow by gravity out of tube 12 onto the first vibrating chute 14. Sufficient spacing is provided between tube 12 and chute 14 to allow for the amplitude of vibration of the chute so that no interference is created between these two elements. Vibrators 32 and 34 produce a vibration frequency of chutes 14 and 18, respectively, of 60 cycles per second. This rather severe vibration or agitation tends to bounce the bolts about and to further separate the individual bolts.

Collar 42 serves as a transition element between vibrating chute 14 and rotating tube 16. The bolts emerging from chute 14 tend to bounce through the collar 42 into tube 16. This transitional zone prevents any interference between the chute 14 and tube 16, and avoids the danger that a bolt might possibly jam between the two moving elements. Once inside of tube 16, the bolts tend to settle between the ridges of adjacent threads of the spring 44. The spring acts as a feed screw and moves the bolts slowly along the length of the tube. As was noted above, the spacing between adjacent portions of the screw increases from the inlet to the outlet of the tube. This varying spacing tends to further separate and slow down the flow of bolts through the system.

The bolts emerge from tube 16 and fall by gravity into the second vibrating chute 18, which functions similarly to chute 14 to bounce and further separate any groups of bolts which have remained entangled at this point. From chute 18 the bolts flow by gravity to funnel 20 and onto the weighing pan 22. When the desired weight is reached, the motors driving the various elements of the dribble feed system are shut off. Since the bolts are fed extremely slowly to chute 18 by tube 16, and since the vibration of the chute very quickly ejects any bolts from the chute, the number of bolts on chute 18 at any one time would be extremely small. Few, if any bolts would drop into the weighing pan after the system was stopped. In this way the flow can be abruptly terminated and an accurate weight is assured.

This invention may be further developed within the scope of the following claims. Accordingly, the above description is to be interpreted as illustrative of only a single embodiment of this invention and is not to be limited to such embodiment.

I now claim:

1. A dribble feed system comprising:
 a hopper;
 a first tube positioned directly beneath said hopper and inclined slightly from the horizontal;
 first drive means operatively connected to said first tube for causing said tube to oscillate about its longitudinal axis;
 a first inclined chute axially aligned with said first tube and positioned so that its upper end is in close proximity to and directly beneath the lower end of said first tube;
 a second tube substantially horizontal and axially aligned with said first inclined chute and having a first end in close proximity to the lower end of said first inclined chute;
 a stationary collar bridging the gap between said first chute and said second tube, thereby establishing a substantially continuous flow channel therebetween;
 second drive means operatively connected to said second tube for rotating said second tube about its longitudinal axis;
 a second inclined chute axially aligned with said second tube and positioned so that its upper end is in close proximity to and directly beneath the second end of said second tube;
 vibrator means operatively connected to said first and second inclined chutes for vibrating said chutes;
 said second tube having an inwardly projecting helical ridge extending along the entire length of its interior, the pitch of said helix increasing from the first end of said tube to the second end of said tube;
 whereby discrete items fed from said hopper to said first tubes are passed along through the system and tend to be widely separated as they emerge from said second inclined chute as the result of the oscillation, vibration, and rotation to which they are subjected in the system.

2. The dribble feed system of claim 1, wherein the oscillation of said first tube produces a concomitant synchronized opening and closing of the flow path between said hopper and said first tube.

3. A dribble feed system comprising:
 a hopper containing parts to be fed;
 an inclined chute and means for vibrating said inclined chute;
 means for feeding parts from said hopper into said inclined chute;
 a horizontally arranged tube axially aligned with said chute and having an end in close proximity to the lower end of said inclined chute;
 a stationary collar bridging the gap between said chute and said tube, thereby establishing a substantially continuous flow channel therebetween;
 drive means operatively connected to said tube for rotating said tube about its axis;
 an inwardly projecting helical-like ridge extending along the entire length of the interior of said tube for moving parts within said tube;
 a chute arranged at the opposite end of said tube for receiving parts fed through said tube.

4. A dribble feed system comprising:
 a hopper containing parts to be fed and having an outlet at its lowermost portion;
 an inclined tube positioned directly beneath the outlet of said hopper;
 means for causing said inclined tube to oscillate about its longitudinal axis;
 said inclined tube having a plurality of inwardly projecting ridges along its inner length, said ridges being non-parallel to the axis of said tube;
 said inclined tube further having a port therein extending partially around the circumference of the tube, said port being positioned directly beneath the outlet of said hopper and cooperating therewith to act as a valve to open and close the flow path therebetween as said inclined tube is oscillated.

References Cited by the Examiner

UNITED STATES PATENTS

| | | | |
|---|---|---|---|
| 1,282,310 | 10/1918 | Strasburger | 222—217 X |
| 1,326,925 | 1/1920 | Goldberg | 221—156 X |
| 2,775,375 | 12/1956 | Haller | 222—362 |

ROBERT B. REEVES, *Primary Examiner.*

S. H. TOLLBERG, *Assistant Examiner.*